A. H. THOMAS.
TOOL JOINT.
APPLICATION FILED JAN. 19, 1920.

1,386,210. Patented Aug. 2, 1921.

AVERY H. THOMAS INVENTOR

Jesse R. Stone ATTORNEY

UNITED STATES PATENT OFFICE.

AVERY H. THOMAS, OF HOUSTON, TEXAS.

TOOL-JOINT.

1,386,210.   Specification of Letters Patent.   Patented Aug. 2, 1921.

Application filed January 19, 1920. Serial No. 352,489.

*To all whom it may concern:*

Be it known that I, AVERY H. THOMAS, a citizen of the United States, residing at Houston, Harris county, Texas, have invented a certain new and useful Improvement in Tool-Joints, of which the following is a full, clear, and exact description, such as will enable others skilled in the art to which it appertains to make and use the same.

My invention relates to an improvement in tool joints to be used in forming a detachable connection between lengths of pipe. It finds especial application in connection with drill pipe used in drilling deep wells for oil, gas or water, etc.

In the drilling of deep wells it has become customary to use a tool joint as a connection between sections of pipe at regular intervals throughout the string of pipe. The usual custom is to use an ordinary coupling for some of the connections but to introduce a tool joint at about every third length of pipe throughout the string. The tool joint forms a quickly detachable connection which, when the drill pipe is withdrawn from the well to repair the drill or for other purposes, may be easily and quickly released so that the pipe may be uncoupled and assembled in the derrick in lengths of three sections of the drill stem at a time. The tool joint is customarily made of a good quality of steel and is threaded with a coarse tapered thread so that a few turns of the pipe will serve to release the sections connected by the same.

An object of my invention is to provide a tool joint for this purpose which will make the connection between the different lengths of pipe without the usual threaded joint and which will be strong in construction and quickly detachable, and also not easily mutilated in use.

Figure 1:
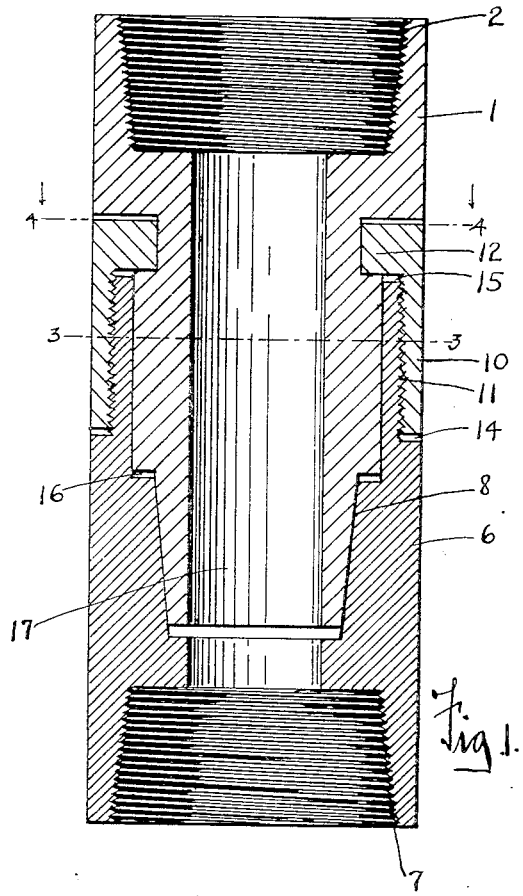
Figure 2:
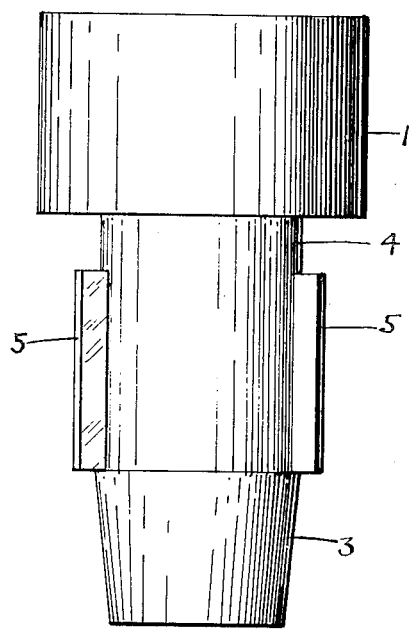
Figure 3:
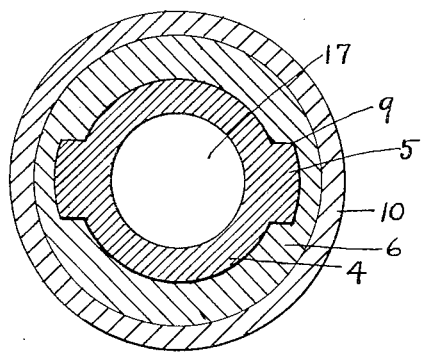
Figure 4:
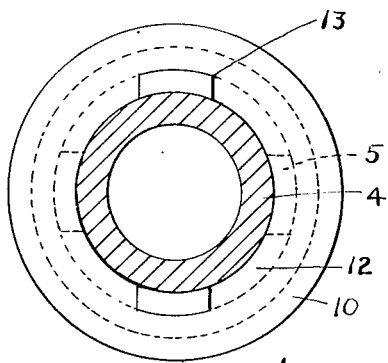

Referring to the drawing forming a part of this specification and wherein like numerals of reference are applied to like parts throughout the several views, Figure 1 is a central longitudinal section through a tool joint constituting my invention; Fig. 2 is a side elevation of the pin member of the joint shown in Fig. 1; Fig. 3 is a transverse section on the plane 3—3 of Fig. 1; and Fig. 4 is a similar section on the plane 4—4 of Fig. 1 looking in the direction of the arrows.

In the construction of my improved tool joint I use a tubular pin member 1 threaded at one end at 2 for connection with the length of pipe or drill stem and having a longitudinal passage 17 therethrough. The other end is tapered inwardly toward the lower portion thereof to form a frusto-conical connecting member 3, the purpose of which is to form a fluid tight contact with the coöperating section. Above the tapered portion and between the same and the cylindrical upper end 1, the pin member is cylindrical in shape, as shown at 4 in Fig. 2. This cylindrical portion has, toward the lower end thereof, two or more radially projecting keys or lugs 5. In the drawing I have shown two of these keys but it is obvious that any other number of such keys might be used as found advantageous.

The coöperating box member 6 of the tool joint is of the same external diameter as the upper end of the pin member 1. It is threaded at the lower end at 7 for connection with the drill stem and is recessed in the upper portion thereof to receive the pin member 1 just described. The lower end of the recess is tapered at 8 to provide a seat for the tapered portion 3 of the pin member so as to form a fluid tight joint when the parts are firmly forced together. Lateral key-ways or grooves 9 are formed in the said recess to receive the keys 5 of the pin member.

The two coöperating sections of my improved joint are adapted to be secured together by means of an intermediate collar 10 which is threaded on the reduced upper end 11 of the box member, as shown in Fig. 1. The threaded connection between the collar 10 and the end 11 is made with a lefthand thread so that rotation of the joint in a righthand direction will not tend to loosen same. The upper end of the collar 10 is formed with an inwardly projecting annular flange 12 arranged to contact on its inner face with the cylindrical portion 4 of the pin member. As shown in Fig. 3, this collar has two opposite key-ways or grooves 13 of sufficient size to allow the passage therethrough of the keys 5 upon the box member.

In the operation of my tool joint the pin member 1 is screwed upon the end of one section of the pipe which is to be connected and the box member 6 is screwed upon the opposite end of a similar length of pipe. The collar 10 is screwed downwardly upon the upper end 11 of the box member and is adjusted in such position that the key-ways 13 will register in line with the key-ways 9 in the box member, and so that in this position the collar 10 will be capable of still further tightening, there being a space 14 at the lower end thereof and also space 15 at the lower face of the inner flange 12 which will allow of further downward movement. The pin member 1 of the coöperating length of pipe is then introduced into the inner recessed portion of the box member, the keys 5 passing downwardly into the key-way 9 in the box member. The keys 5 are so arranged that when the lower tapered portion 3 of the pin is seated firmly in the conical seat 8 of the box member, there will be a space 16 below the keys whereby the full weight of the lengths of drill stem will rest upon the conical seat 8. The collar 10 is then given a quarter-turn. In other words, it is rotated through an angle of 90° so that the key-way 11 in the flange 12 will no longer register with the upper end of the keys 5, but will be positioned at approximately right angles thereto, as shown in Fig. 4. It is also contemplated that this quarter-turn of the collar will be sufficient to tighten the flange 12 securely upon the upper end of the keys 5 so as to hold the pin member firmly within the seat 8 of the box member, thereby maintaining a tight joint at all times. It is obvious that when the joint is to be released it will only be necessary to give the collar 10 a quarter turn bringing the key-way 13 into registration with the key-way 9 of the box member, thus allowing the pin to be withdrawn with no further difficulty. This type of tool joint is thus quickly releasable and strong in construction. The torsional effect, due to the rotation of the pipe, will be taken up by the keys 5 fitting within the key-ways 9 of the box. The weight of the lengths of drill stem will be carried by the strong inwardly projecting flange 12 of the collar contacting with the upper ends of the keys 5. The threading of the collar 10 upon the threaded portion 11 of the box member by a lefthand thread will make it impossible for the rotation of the pipe in a righthand direction to loosen the collar and thus allow leakage at the joint.

Having thus described my invention the advantages of which will be obvious, what I claim as new and desire to protect by Letters Patent is:

1. In a tool joint, a pin member threaded at one end for attachment to a pipe, the other end being tapered, a cylindrical central portion formed with a plurality of radially projecting key members extending throughout the length of said central portion, a box member threaded at one end for attachment to a pipe, the other end being recessed interiorly to form a close fit with the pin member, a connecting collar threaded on the inner end of the box member, said collar having an annular flange thereon formed with key-ways to allow the passage of said keys, and adapted to be secured by a partial turn of said collar.

2. In a tool joint, a pin member having one end threaded for connection with a drill pipe, the other end being reduced in diameter and tapered, laterally projecting keys on said pin member extending longitudinally thereof for the greater portion of its length, a box member threaded for attachment with a pipe and recessed at the other end to fit closely about said pin member and the said keys and means to lock said pin member into operative position.

3. In a tool joint, a pin member threaded for attachment to a drill stem, laterally projecting keys extending longitudinally throughout the greater portion of the pin member, a box member recessed interiorly to receive said pin member and having key-ways to receive said keys and a collar threaded on said box member to lock said keys with said key-ways and draw said members tightly together.

4. In a tool joint, a pin member threaded at one end for attachment to a drill pipe and reduced in diameter toward the other end and tapered at the extreme lower end, laterally projecting keys on said reduced portion extending longitudinally throughout the greater portion of the pin member, a box member threaded for attachment to a pipe and being recessed to receive said reduced portion of said pin member, and a connecting collar on said box member having key-ways to allow the passage of said keys and adapted when partially rotated to bear upon the upper ends of said keys and hold the tapered portion firmly in its seat.

5. A connection between sections of pipe comprising a pin member having a reduced portion with outwardly projecting keys extending longitudinally thereof for the greater portion of its length, a box member recessed interiorly to receive said reduced portion, key-ways therein to maintain a close fit with said keys, and means to secure said pin firmly in said box comprising a collar on said box member adjustable by a partial rotation thereof.

6. A connection between sections of pipe comprising in combination a pin member threaded at one end for connection with a pipe and reduced in diameter at the other end, and a box member threaded at one end and recessed at the other end to receive said pin, keys on one of said members extending longitudinally thereof for the greater portion of its length, and keyways on the other to receive said keys and a collar on the latter of said members to hold said keys firmly in said keyways.

In testimony whereof, I hereunto affix my signature, this the 15th day of January, A. D., 1920.

AVERY H. THOMAS.